United States Patent

Campbell et al.

[15] 3,641,277

[45] Feb. 8, 1972

[54] FILE PROTECT SYSTEM FOR MAGNETIC TAPE UNIT WITH SOLENOID FOR SENSING PRESENCE OR ABSENCE OR REEL RING

[72] Inventors: Ronald R. Campbell, Boulder; Roger A. Monroe, Longmont, both of Colo.

[73] Assignee: Storage Technology Corporation, Boulder, Colo.

[22] Filed: Apr. 27, 1970

[21] Appl. No.: 32,001

[52] U.S. Cl. ..........................................179/100.2D, 226/91
[51] Int. Cl. ..........................................................G11b 15/04
[58] Field of Search ...........................179/100.2 D; 335/284; 274/11 E, 11 F; 242/71.8; 226/91, 92

[56] References Cited

UNITED STATES PATENTS 3,417,387 12/1968 Rayfield..........................179/100.2 D
3,335,410 8/1967 Baskin et al.....................179/100.2 D
3,199,091 8/1965 Barkhuff et al. ................179/100.2 D

*Primary Examiner*—Bernard Konick
*Assistant Examiner*—Alfred H. Eddleman
*Attorney*—Woodcock, Washburn, Kurtz & Mackiewicz

[57] ABSTRACT

In a magnetic recording and reproducing unit the magnetic heads are enabled to write or erase a magnetic tape only if a reel ring is inserted in the reel of magnetic tape. The file protect system includes a solenoid which is momentarily energized after a reel is placed in the unit. The solenoid moves a plunger into a position which senses the presence or absence of a reel ring. The plunger momentarily actuates switch contacts if the plunger contacts a reel ring. The switch contacts set a latch having an output which enables the write and erase heads only if the latch is set. The file protect system is fail-safe because the latch is always reset when power is turned on or when a reel is removed. If there is failure of the file protect system the latch will remain reset insuring that the magnetic tape cannot be erased or written upon.

4 Claims, 6 Drawing Figures

FILE PROTECT SYSTEM FOR MAGNETIC TAPE UNIT WITH SOLENOID FOR SENSING PRESENCE OR ABSENCE OR REEL RING

BACKGROUND OF THE INVENTION

This invention relates to file protect systems for magnetic recording and reproducing units and more particularly to a fail-safe file protect system which will prevent erasure or recording on a magnetic tape even if there is a failure of the file protect system.

Magnetic tape units are extensively used with digital data processing equipment. One example of such a system is the IBM 2420 Model 5 magnetic tape unit described in that company's bulletin file S/360–05, Form A32–0007–1.

In units for this type it has become standard practice to provide a file protect system which prevents erasure or writing over a valuable file recorded on a magnetic tape. A common file protect system includes reel rings which are inserts for the magnetic tape reel. Only when this ring is inserted into the reel can the magnetic tape be altered in its magnetic state. A button on the magnetic tape unit is actuated by the reel ring when the reel is placed on the machine. Only when this button is actuated can the write and erase circuits be energized.

The foregoing file protect systems have worked quite satisfactorily. They are susceptible to malfunction. For example, when a reel is placed on the machine it is possible for the operator to depress the file protect button by error. Then, it is possible to write over or erase the magnetic tape even though a reel ring was not placed on the reel. Also, if the button sticks, or if a relay "hangs up," the machine may be placed in a "not file protect" mode even though that is not the intention of the operator.

SUMMARY OF THE INVENTION

In accordance with an important aspect of this invention, the file protect system includes a solenoid which is momentarily energized when a reel is placed in the unit. The solenoid moves a plunger into a position which senses the presence or absence of a reel ring. If the ring is present, switch contacts are transferred. Transfer of these contacts is detected by a logic circuit which sets a latch. The output of this latch enables the magnetic heads to write on or erase the magnetic tape only if the latch is set. Because the solenoid plunger senses the presence of absence of the reel ring only after the magnetic tape reel is placed in the machine, it is virtually impossible to enable the magnetic heads to write on or erase a tape unless a reel ring has been placed in the reel.

In accordance with another aspect of this invention the latch is reset each time power is applied to the unit and each time a reel is removed from the machine. Without this feature, a power failure and subsequent reapplication of power might cause the latch to be set in a "not file protect" mode when in fact a file protected reel was in the machine. With this invention the machine will always be in a file protect mode when power is initially applied. Also, since the latch is reset each time a reel is removed from the machine, there is no possibility that the machine can be left in a "not file protect" mode when a new file protected reel is placed on the machine.

In accordance with another important aspect of this invention the contacts which are transferred by the plunger include both a normally open and a normally closed contact. A logic circuit detects the transfer of both the normally open and the normally closed contacts. This insures that an accidental transfer of one or the other contact will not set the latch to a "not file protect" mode in the absence of a reel ring.

The magnetic tape unit to which this invention is applicable includes circuitry for generating a load signal of fixed time duration when the load button is pushed. This load signal is used to energized the solenoid which senses presence of the reel ring. Upon termination of the load signal a thread signal of fixed duration is generated to initiate the automatic threading operation.

In accordance with another important aspect of this invention the contacts which are transferred by the plunger are connected to a logic circuit which inhibits the thread signal when the contacts are transferred. This protects the plunger and the reel ring from accidental damage which might be caused by the rotation of the reel before the plunger is retracted. For example, if the plunger hangs up in its extended position the switch contacts will remain transferred. In this case the logic circuit inhibits the thread signal so that automatic threading of the reel is not started.

The foregoing and other objects, features and advantages of this invention will be better understood from the following more detailed description.

FIGS. *2a–2e* are waveforms depicting the operation of the system.

DESCRIPTION OF A PARTICULAR EMBODIMENT

Figure 1:
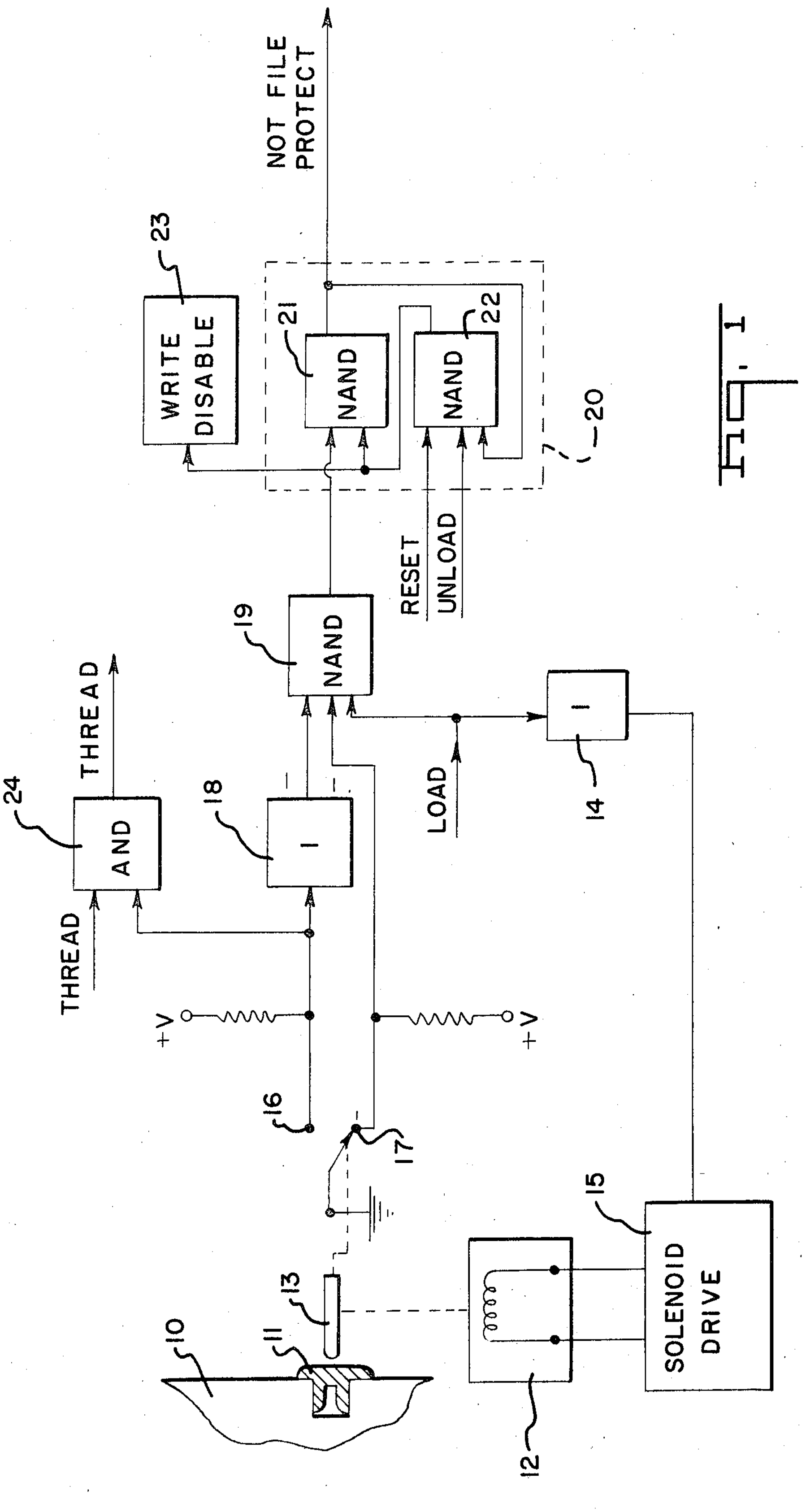
FIG. 1 is a block diagram of the file protect system.

Referring to FIG. 1 there is shown a portion 10 of a magnetic tape reel. The reel 10 is indicated to be of the type which includes a groove around the reel hub. A reel ring 11 is shown in position in this groove. (The reel ring is also often referred to as a filed protect ring.) In order to sense the presence or absence of the reel ring, a solenoid 12 is momentarily energized after a reel is placed in the unit. The solenoid 12 has an actuator which moves a plunger 13 into a position which senses the presence or absence of a reel ring.

The magnetic tape unit to which the present invention is applicable is of the type in which a load signal of fixed duration is generated when the "load" button is depressed. The load signal is applied through drive circuit 14 to the solenoid drive circuit 15. The solenoid drive circuit energizes the solenoid 12 for the fixed time duration. This moves the plunger toward the file protect ring and then retracts it. If the plunger 13 contacts a reel ring, the plunger transfers the switch which includes the normally open contact 16 and the normally closed contact 17.

The logic circuit for detecting the transfer of the switch includes the invertor 18 and the Nand-gate 19. Upon actuation of the switch by the plunger 13, ground potential is applied to the normally open contact 16 and removed from the normally closed contact 17. This applies a positive level to the top two inputs of Nand-gate 19. The load signal, the lower input to Nand-gate 19, is also positive during the fixed duration load signal. Therefore, the output of Nand-gate 19 switches its state thereby setting the latch 20. The latch 20 includes two Nand-gates 21 and 22. When the latch 20 is set the output of the latch goes up thereby producing a "not file protect" signal. This signal is used to enable the magnetic head so that it is possible to write on or erases magnetic tape.

In order to reset the latch 20 a reset pulse is applied to Nand-gate 22 when the power is applied to the magnetic tape unit. Also, after a tape has been rewound and is to be removed from the machine, an unload signal is generated. This is applied to the Nand-gate 22 to reset the latch 20. When the latch 20 is in its reset condition a write disable indicator 23 is energized to indicate the status of the machine.

In order to protect the plunger 13 and the reel from accidental damage which might be caused by rotation of the reel before the plunger is retracted, an AND-gate 24 is provided to inhibit the thread signal. The normally positive voltage applied to the lower input to AND-gate 24 normally allows the thread signal to appear at the output of AND-gate 24. However, when the switch is transferred so that ground potential is placed on the normally open contact 16, the AND-gate 24 is inhibited.

The operation of the file protect system of this invention can be summarized with reference to the timing diagram of FIGS. *2a–2e*. When the power is applied to the magnetic tape unit, a latch reset signal (FIG. *2a*) is produced which resets the latch 20. Alternatively, when a reel of tape is removed from the machine, the unload signal (FIG. 2*d*) resets the latch 20. The latch 20 will always be in its reset condition with the exception of the sequence which will now be described.

Figures 2A, 2B, 2C, 2D, 2E:
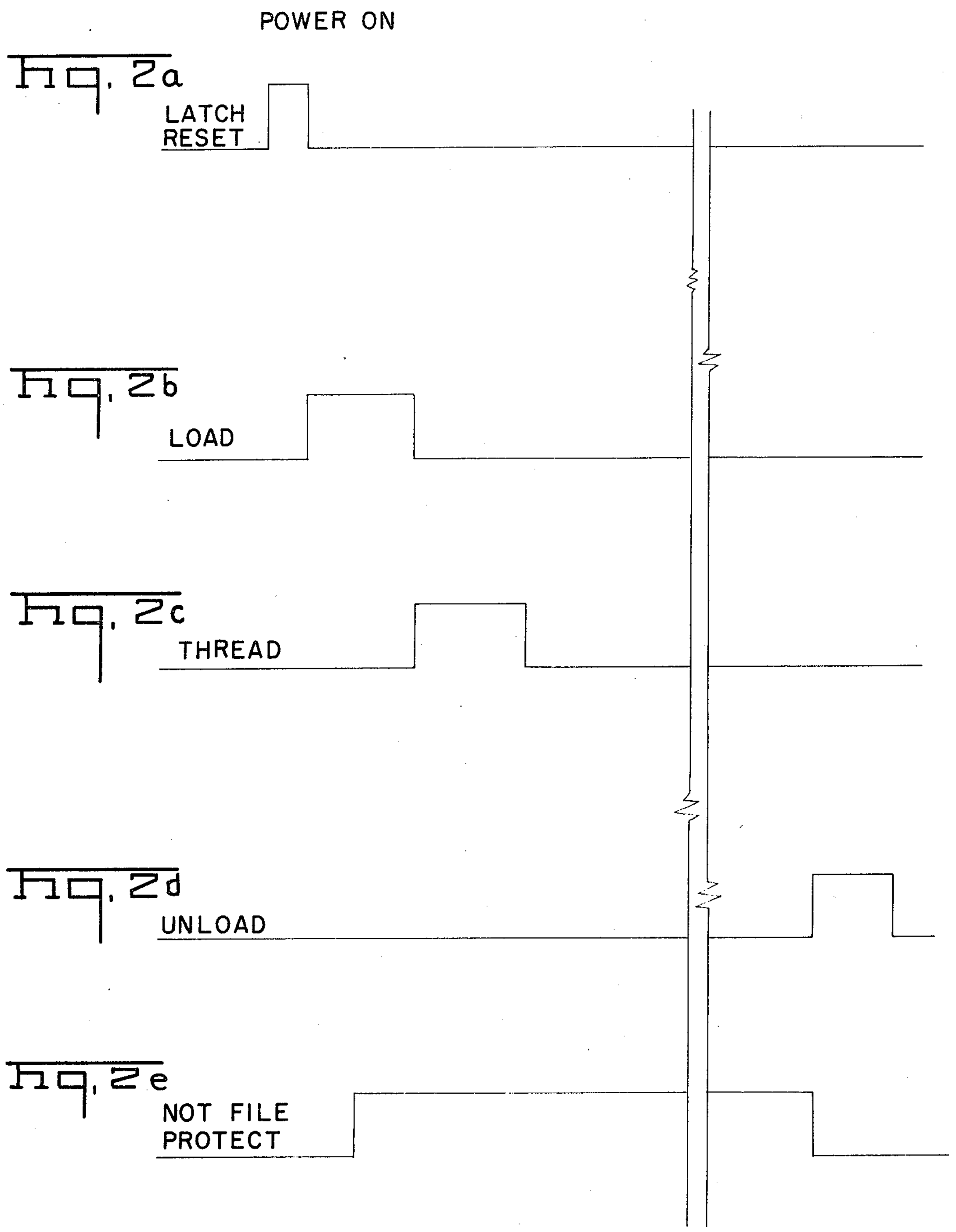

When the start button is depressed, the machine produces the fixed duration load signal shown in FIG. 2*b*. This acts through the load drive block 14 and the solenoid drive 15 to energize the solenoid 12. The solenoid 12 moves the plunger 13 into the position to sense the presence of the reel ring 11. Upon contacting the reel ring 11, the plunger 13 transfers the normally open and normally closed switch contacts. This enables Nand-gate 19 to set the latch 20. The output of latch 20 goes up to signify a "not file protect" condition as shown in FIG. 2*e*. This signal enables the magnetic write head. The latch remains in this condition until the reel is taken off the machine. At this time, the unload signal, FIG. 2*d*, resets the latch 20.

Many different electromechanical and logic components can be used to implement the file protect system of this invention. One commercially available solenoid actuator which is suitable for use is the Guardian 16–C. This solenoid is modified so that the actuator transfers a set of normally open and normally closed contacts.

While a particular embodiment of the invention has been shown and described, modifications are within the scope of the invention. The appended claims are intended to cover any such modifications.

What is claimed is:

1. A file protect system for a magnetic recording and reproducing unit of the tape in which magnetic heads alter the magnetic state of the magnetic tape only if a reel ring is inserted in the reel of magnetic tape comprising:

a solenoid which is deenergized when the reel is placed in the unit and is momentarily energized and then deenergized after a reel is placed in the unit and before the unit moves the magnetic tape past the magnetic heads, a plunger moved by energization of said solenoid into a momentary position which senses the presence of a reel ring;

switch means which are momentarily actuated by said plunger when it contacts a reel ring, a latch which is set by the actuation of said switch means, said latch having an output which enables said magnetic heads only if said latch is set.

2. The file protect system recited in claim 1 wherein said switch means includes normally open contacts and normally closed contacts, said system further comprising:

a logic circuit for detecting actuation of both the normally open and the normally closed contacts, the output of said logic circuit being applied to set said latch only when both said normally open and normally closed contacts are actuated by said plunger when it contacts a reel ring.

3. The system recited in claim 1 wherein said latch is reset when the power for said recording and reproducing unit is turned on and when said unit is in a condition in which the magnetic tape reel can be removed from said unit.

4. The system recited in claim 1 wherein said solenoid is momentarily energized by a load signal of fixed duration and wherein a thread signal of fixed duration is produced after termination of said load signal, said system further comprising:

a logic circuit, said switch means being connected to said logic circuit and said thread signal being applied to said logic circuit, said logic circuit inhibiting said thread signal during actuation of said switch means to prevent threading of a magnetic tape reel if said switch means remain actuated.

* * * * *